(12) United States Patent
Tsuchie

(10) Patent No.: US 7,225,389 B2
(45) Date of Patent: May 29, 2007

(54) METHOD AND CIRCUIT FOR CORRECTING POWER AMPLIFIER DISTORTION

(75) Inventor: Koji Tsuchie, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 43 days.

(21) Appl. No.: 11/246,133

(22) Filed: Oct. 11, 2005

(65) Prior Publication Data

US 2006/0031735 A1    Feb. 9, 2006

Related U.S. Application Data

(62) Division of application No. 10/132,476, filed on Apr. 26, 2002, now Pat. No. 6,983,411.

(30) Foreign Application Priority Data

Mar. 19, 2002   (JP) .............................. 2002-077092

(51) Int. Cl.
  *H03M 13/00* (2006.01)
(52) U.S. Cl. ..................... 714/774; 375/297; 455/114.3
(58) Field of Classification Search ................. 714/774; 455/114.3
  See application file for complete search history.

(56) References Cited

U.S. PATENT DOCUMENTS

| | | | |
|---|---|---|---|
| 3,622,986 A * | 11/1971 | Tang et al. .................. | 714/810 |
| 5,325,403 A | 6/1994 | Siwiak et al. | |
| 5,710,653 A | 1/1998 | Nemecek et al. | |
| 5,721,745 A | 2/1998 | Hladik et al. | |
| 6,029,264 A | 2/2000 | Kobayashi et al. | |
| 6,223,324 B1 * | 4/2001 | Sinha et al. ................. | 714/776 |
| 6,263,466 B1 | 7/2001 | Hinedi et al. | |
| 6,400,728 B1 | 6/2002 | Ott | |

(Continued)

FOREIGN PATENT DOCUMENTS

JP    2000-115123    4/2000

(Continued)

OTHER PUBLICATIONS

Huang et al., Nonlinear Compensation of High Power Amplifier Distortion for Communication Using a Historgram-Based Method, Nov. 2006, IEEE, vol. 54, pp. 4343-4351.*

(Continued)

*Primary Examiner*—Guy Lamarre
*Assistant Examiner*—Mujtaba K. Chaudry
(74) *Attorney, Agent, or Firm*—Oblon, Spivak, McClelland, Maier & Neustadt, P.C.

(57) ABSTRACT

An equalizing and error correcting section includes an equalizing section, an error processing sections, and a select section. The equalizing section outputs the received data subjected only to channel compensation and phase rotation compensation and the received data subjected not only to those compensations but also to power amplifier distortion compensation. These two received data items are subjected to an error process separately at the error processing sections. On the basis of the decisions at the error processing sections, the select section makes a final decision whether the receiving process has been successful or unsuccessful. That is, if either of the two decisions has been successful, the receiving process is regarded as successful. Only if both of the two decisions have been unsuccessful, the receiving process is regarded as unsuccessful.

4 Claims, 6 Drawing Sheets

U.S. PATENT DOCUMENTS

| | | | |
|---|---|---|---|
| 6,452,447 | B2* | 9/2002 | Kusunoki .................. 330/149 |
| 6,665,831 | B1 | 12/2003 | Yoshida et al. |
| 6,724,555 | B2 | 4/2004 | Ohta |
| 6,836,517 | B2* | 12/2004 | Nagatani et al. ............ 375/296 |
| 6,980,602 | B1* | 12/2005 | Kleinerman et al. ........ 375/262 |
| 2002/0065048 | A1* | 5/2002 | Nagatani et al. .............. 455/63 |

FOREIGN PATENT DOCUMENTS

| | | |
|---|---|---|
| JP | 2001-127819 | 5/2001 |
| JP | 2001-144724 | 5/2001 |

OTHER PUBLICATIONS

Santarelli et al., A Simplified Approach for Quasi-linear Power Amplifier Distortion Evaluation, 2003, 33rd European Microwave Conference, pp. 387-390.*

Andrenko et al., Optimization Analysis of Feedforward power Amplifier, 1999, IEEE, pp. 626-629.*

Lui et al., Considerations on Applying OFDM in Highly Efficient Power Amplifier, Nov. 1999, IEEE, vol. 43, pp. 1329-1336.*

"Wireless LAN MAC and PHY specifications," IEEE Standard 802, 11a-1999, pp. 24, 29-30.

Hiroyuki Hosono, et al., "A Compensating Method of Nonlinear Distortion for OFDM", Technical Research Report of The Institute of Electronics, Information and Communication Engineers SAT2000-136, vol. 100, No. 638, Feb. 16, 2001, pp. 87-94.

Hiroyuki Hosono, et al., "One Method for Compensation of Nonlinear Distortion for OFDM", Collected Papers in Lectures of General Conference of The Institute of Electronics, Information and Communication Engineers Communications 1, B-3-10, Mar. 7, 2001, 5 pages.

* cited by examiner

METHOD AND CIRCUIT FOR CORRECTING POWER AMPLIFIER DISTORTION

CROSS-REFERENCE TO RELATED APPLICATIONS

This application is based upon and claims the benefit of priority from U.S. patent application Ser. No. 10/132,476, filed Apr. 26, 2002, now U.S. Pat. No. 6,983,411 and the prior Japanese Patent Application No. 2002-077092, filed Mar. 19, 2002, the entire contents of which are incorporated herein by reference.

BACKGROUND OF THE INVENTION

1. Field of the Invention

This invention relates to a receiving apparatus in communication equipment using a multicarrier modulation method, and more particularly to a receiving apparatus in communication equipment using the OFDM (Orthogonal Frequency Division Multiplexing) modulation method.

2. Description of the Related Art

OFDM (Orthogonal Frequency Division Multiplexing) is characterized by high bandwidth efficiency and robustness against multipath environment. In recent years, OFDM system has been applied to terrestrial digital television broadcasting and wireless LAN, and therefore has attracted considerable attention.

In the OFDM method, data is allocated to a number of orthogonal subcarriers and then modulation and demodulation are performed. The transmitter requires an IFFT (Inverse Fast Fourier Transform) process and the receiver needs an FFT process. As a result, the configuration of an OFDM transmitting and receiving unit is very complex. However, recent advances in LSI technology have made the configuration feasible.

Figure 1:
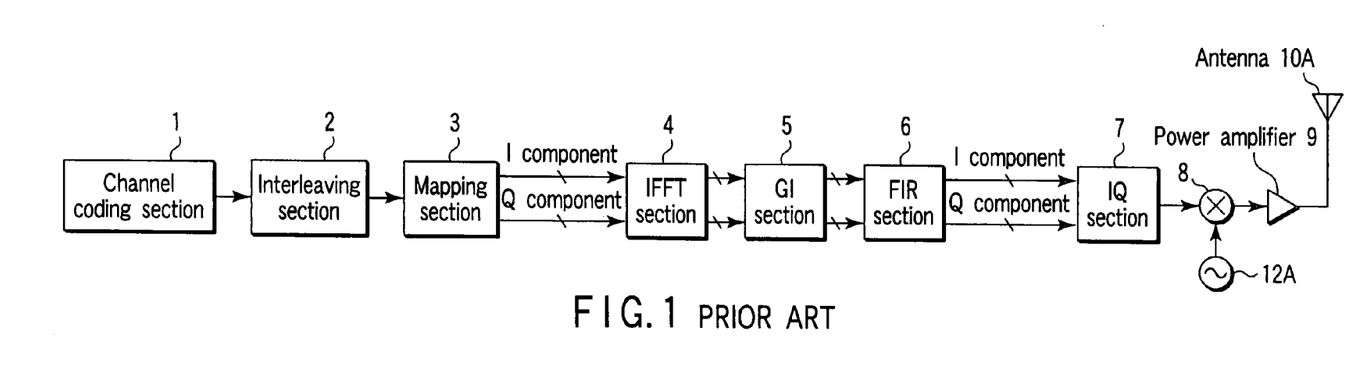
FIG. 1 shows an example of a multicarrier modulation signal transmitting apparatus.

FIG. 1 shows an example of a multicarrier modulation signal transmitting apparatus.

A channel coding section 1 subjects the transmission data to channel coding process. The channel coding process includes, for example, an error detection process using CRC (Cyclic Redundancy Check) codes and an error correcting process using convolutional codes.

An interleaving section 2 disperses burst errors, randomizes error series, and changes the order of data items to yield a more effective result of the error correction. After a serial/parallel converter converts the transmission data into a symbol string made up of a number of subcarriers, the resulting data is inputted to a mapping section 3.

The mapping section 3 separates the inputted data into the I (real number) component and the Q (imaginary number) component according to a modulation method, such as PSK (Phase Shift Keying) or QAM (Quadrature Amplitude Modulation), thereby determining the amplitude and phase of the subcarriers. The I component corresponds to the real part of a complex number on the frequency axis and the Q component corresponds to the imaginary part of the complex number on the frequency axis.

At an IFFT (Inverse Fast Fourier Transform) section 4, the I component signal and Q component signal in frequency domain are transformed into time domain data. Those signals are further converted into serial data by a parallel/serial converter. A GI (Guard Interval) add section 5 adds a guard interval to the transmission data for the purpose of alleviating interference from delay paths.

The guard-interval-added transmission data is subjected to a filtering process at an FIR (Finite Impulse Response) section 6. Furthermore, an IQ modulation (or orthogonal modulation) section 7 subjects the transmission data to orthogonal modulation.

At a multiplier circuit (or mixer) 8, the transmission data is converted to a radio frequency band using a clock signal generated by a local oscillator 12A. A power amplifier 9 drives an antenna 10A on the basis of the output data from the multiplier circuit 8. The antenna 10A transmits an OFDM signal.

Figure 2:
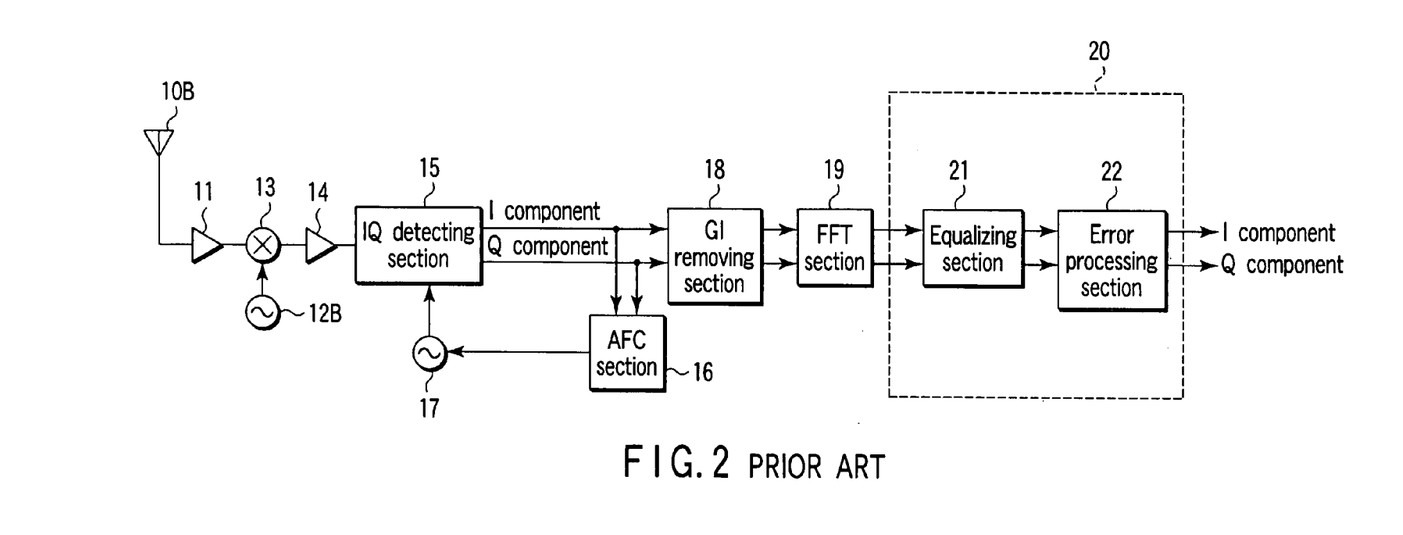
FIG. 2 shows a conventional multicarrier modulation signal receiving apparatus.

FIG. 2 shows an example of a conventional multicarrier modulation signal receiving apparatus.

The OFDM signal received by an antenna 10B passes through a low-noise amplifier 11, a multiplier circuit (or mixer) 3, and an AGC (Auto Gain Control) circuit 14 and is inputted to an IQ detecting section 15. The frequency of the received data is determined by the clock signal generated by a local oscillator 12B.

The IQ detecting section 15 detects the I (real number) component and Q (imaginary number) component from the received OFDM signal. A loop composed of the IQ detecting section 15, AFC (Auto Frequency Control) circuit 16, and oscillator 17 adjusts the frequency of each of the I component and Q component.

A GI (Guard Interval) removing section 18 removes the guard interval added on the transmission side. An FFT (Fast Fourier Transform) section 19 transforms the time-domain received data (I component and Q component) into frequency-domain data. The received data (I component and Q component) outputted from the FFT section 19 represents the phase and amplitude of each subcarrier of the OFDM signal.

The received data (I component and Q component) outputted from the FFT section 19 is inputted to an equalizing and error processing section 20. The equalizing and error processing section 20 is composed of an equalizing section 21 and an error processing section 22.

Figure 3:
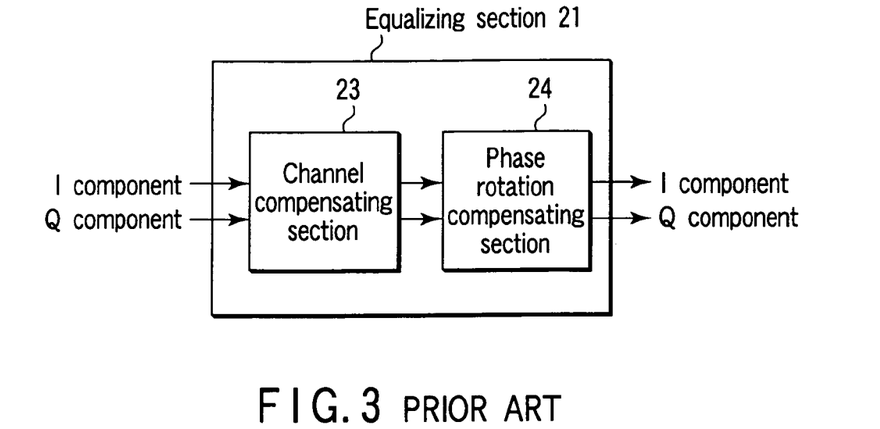
FIG. 3 shows an example of the equalizing section in FIG. 2.

Each subcarrier of the OFDM signal is inputted to the equalizing section 21. The equalizing section 21 equalizes each subcarrier. The equalizing section 2 is composed of a channel compensation section 23 and a phase rotation correcting section 24 as shown in FIG. 3. The channel compensation section 23 compensates for the channel distortion. The phase rotation compensation section 24 compensates for the rotation of the phase caused by the frequency offset or the clock difference between the transmitting apparatus and the receiving apparatus.

Figure 4:
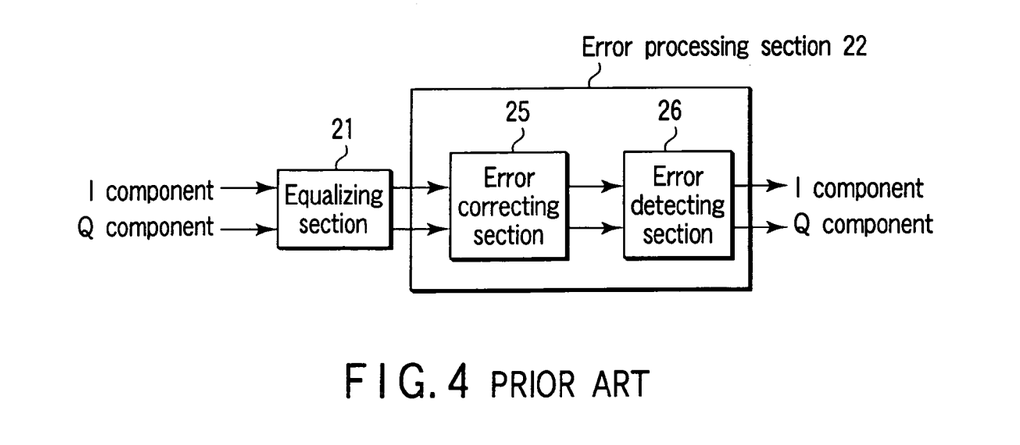
FIG. 4 shows an example of the error processing section in FIG. 10.

Each subcarrier subjected to the equalizing process is inputted to an error processing section 22. The error processing section 22 performs an error correcting and detecting process according to the channel coding process carried out on the transmission side. When the transmission side has performed error correction coding and error detecting coding, the error processing section 22 is composed of an error correcting section 25 and an error detecting section 26 as shown in FIG. 4.

The error correcting section 25 corrects correctable errors. The error detecting section 26 detects errors which could not be corrected at the error correcting section 25. When detecting no error, the error detecting section 26 determines that the receiving process has succeeded. When detecting an error, the error detecting section 26 determines that the receiving process has failed.

For example, in a 5-GHz-band wireless LAN, Viterbi decoding is used in the error correcting process at the error correcting section 25 and error detecting using CRC (Cyclic Redundancy Check) codes is performed in the error detecting process at the error detecting section 26.

As shown in FIGS. 2 and 3, in a conventional multicarrier modulation signal receiving unit, the characteristic of the channel is compensated at the channel compensation section of the equalizing section 21 and the rotation of the phase is compensated at the phase rotation compensation section 24 of the equalizing section 21.

When the distortion of the transmission data is caused by the transmission-side power amplifier (9 in FIG. 1), the equalizing section 21 cannot correct the distortion (or power amplifier distortion). Since the OFDM communication method uses the transmission data obtained by multiplexing many subcarriers, the peak to the average power ratio is great, with the result that there is a strong possibility that power amplifier distortion is caused by the transmission-side power amplifier.

When there is a power amplifier distortion, interference between subcarriers takes place, resulting in a more frequent failure in receiving process at the receiving apparatus, which leads to the deterioration of communication quality.

On the other hand, the power amplifier distortion can be decreased by increasing the amount of input back-off of the transmission-side power amplifier. A power amplifier with a large amount of input back-off has the drawback of consuming a large amount of electric power. In this case, the greater part of the power consumption at the transmitting apparatus is attributable to the power amplifier.

BRIEF SUMMARY OF THE INVENTION

According to a first aspect of the present invention, there is provided a receiving apparatus comprising: an equalizing section which subjects reception data to a first compensating process and to a second compensating process different from the first compensating process; a first error processing section which carries out an error process of the received data subjected to the first compensating process and makes a decision whether the received data has been received successfully or unsuccessfully; a second error processing section which carries out an error process of the reception data subjected to the second compensating process and makes a decision whether the reception data has been received successfully or unsuccessfully; and a select section which makes a final decision whether the reception data has been received successfully or unsuccessfully on the basis of the decisions at the first and second error processing sections.

According to a second aspect of the present invention, there is provided a transmitting and receiving apparatus comprising: the receiving apparatus; and a transmitting apparatus which uses a power amplifier to transmit a multicarrier-modulated transmission data, wherein the receiving apparatus receives the transmission data as reception data.

According to a third aspect of the present invention, there is provided a receiving method comprising: a step of subjecting reception data to a first correcting process, then carrying out an error process of the resulting data, and making a first decision whether the reception data has been received successfully or unsuccessfully; a step of subjecting the reception data to a second correcting process, then carrying out the error process of the resulting data, and making a second decision whether the reception data has been received successfully or unsuccessfully; and a step of making a final decision whether the reception data has been received successfully or unsuccessfully on the basis of the first and second decisions.

DETAILED DESCRIPTION OF THE INVENTION

Hereinafter, referring to the accompanying drawings, a multicarrier modulation signal receiving apparatus according to an aspect of the present invention will be explained in detail.

Figure 5:
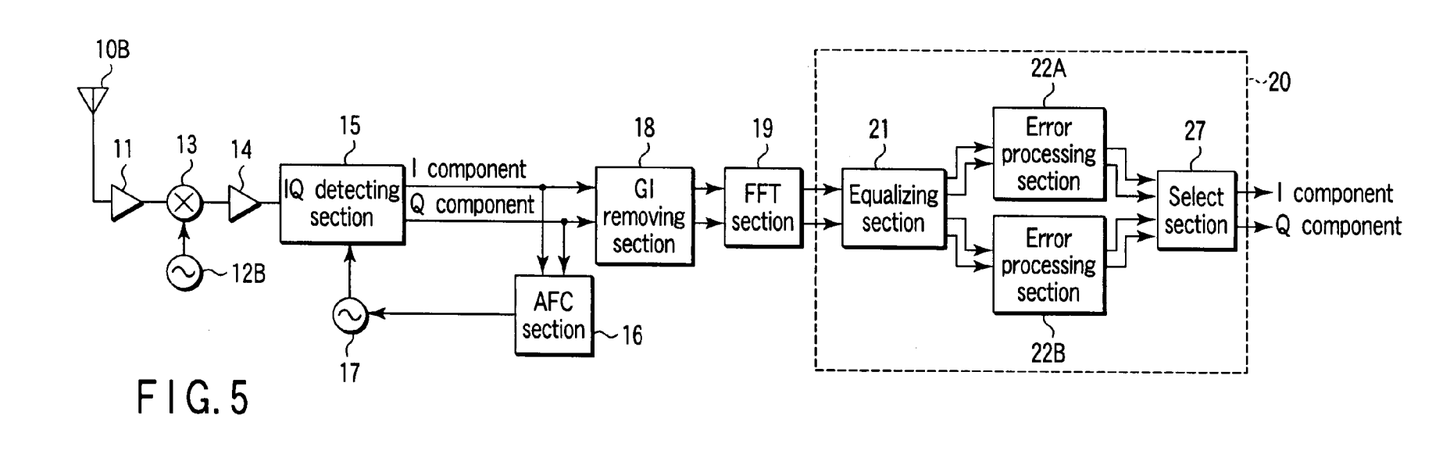
FIG. 5 shows an example of a multicarrier modulation signal receiving apparatus according to the present invention.

FIG. 5 shows a multicarrier modulation signal receiving apparatus according to an aspect of the present invention.

The receiving apparatus of the present invention is characterized by an equalization and error processing section 20. An equalizing section 21 outputs the received data (I component and Q component) subjected only to channel compensation and phase rotation compensation and the received data (I component and Q component) subjected to not only these compensation but also power amplifier distortion compensation.

These two types of received data are subjected to an error correcting process and an error detecting process separately at error processing sections 22A and 22B. On the basis of the result of decision at the error processing section 22A and the result of decision at the error processing section 22B, whether the receiving process is successful or unsuccessful is determined.

Specifically, if one of the two decisions has shown that the receiving process is successful, a select section 27 regards the final decision as successful, selects the received data determined to be successful, and outputs the selected data. If both of the two decisions have shown that the receiving process is successful, the select section 27 regards the final decision as successful, selects one of the two received data items, and outputs the selected data.

If both of the two decisions have shown that the receiving process is unsuccessful, the select section 27 regards the final decision as unsuccessful and does not output the reception data.

With this configuration, the probability of successful data receiving can be made higher and the quality of communication can be improved without increasing the power consumption of the transmission-side power amplifier.

Hereinafter, the multicarrier modulation signal receiving apparatus of the present invention will be explained concretely.

The OFDM signal received by the antenna 10B passes through a low-noise amplifier 11, a multiplier circuit (or mixer) 13, and an AGC (Automatic Gain Control) circuit 14 and is inputted to an IQ detecting section 15. The frequency of the received data is determined by the clock signal generated by a local oscillator 12B.

The IQ detecting section 15 detects the I (real number) component and Q (imaginary number) component from the received OFDM signal. A loop composed of the IQ detecting section 15, AFC (Automatic Frequency Control) circuit 16, and oscillator 17 adjusts the frequency of each of the I component and Q component.

A GI (Guard Interval) removing section 18 removes the guard interval added on the transmission side. An FFT (Fast Fourier Transform) section 19 transforms the time domain received data (I component and Q component) into the frequency domain data. The received data (I component and Q component) outputted from the FFT section 19 represents the phase and amplitude of each subcarrier of the OFDM signal.

The received data (I component and Q component) outputted from the FFT section 19 is inputted to an equalizing and error processing section 20. The equalizing and error processing section 20 is composed of an equalizing section 21, error processing sections 22A and 22B, and select section 27.

Each subcarrier of the OFDM signal is inputted to the equalizing section 21. The equalizing section 21 equalizes each subcarrier.

Figure 6:
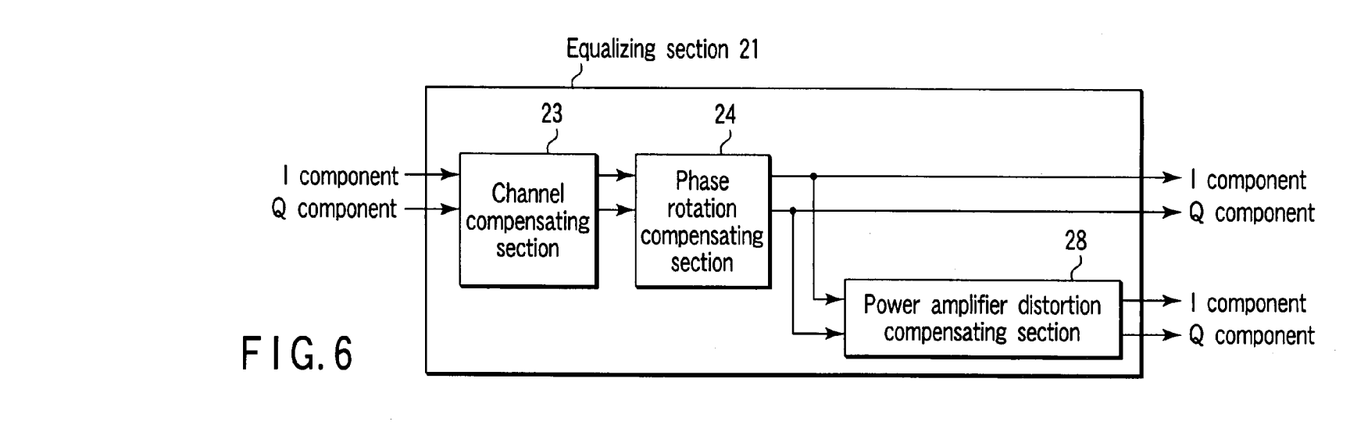
FIG. 6 shows an example of the equalizing section in FIG. 5.

As shown in FIG. 6, the equalizing section 2 is composed of a channel compensating section 23, a phase rotation compensating section 24, and a power amplifier distortion compensating section 28.

The channel compensating section 23 compensates for the characteristic of the channel. The phase rotation compensating section 24 compensates for the rotation of the phase caused by the frequency offset or the clock difference between the transmitting apparatus and the receiving apparatus. The power amplifier distortion compensating section 28 compensates for the distortion caused at the transmission-side power amplifier.

Each subcarrier subjected to equalization is inputted to the error processing sections 22A and 22B. The received data (I component and Q component) subjected to channel compensation and phase rotation compensation is inputted to the error processing section 22A. The received data (I component and Q component) subjected to channel compensation, phase rotation compensation, power amplifier distortion compensation is inputted to the error processing section 22B.

Figure 7:
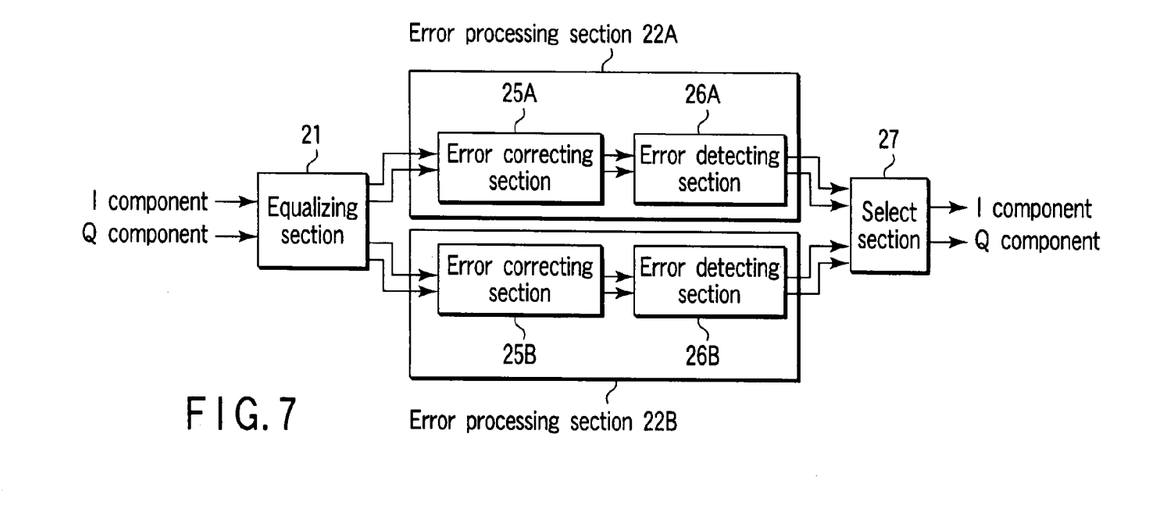
FIG. 7 shows an example of the error processing section in FIG. 5.

As shown in FIG. 7, the error processing section 22A is composed of an error correcting section 25A and an error detecting section 26A. The error processing section 22B, as shown in FIG. 7, is composed of an error correcting section 25B and an error detecting section 26B.

The error correcting sections 25A, 25B correct correctable errors. The error detecting sections 26A, 26B detect uncorrectable errors. If detecting no uncorrectable error, the error detecting sections 26A, 26B determine that the receiving process is successful. If detecting an uncorrectable error, they determine that the receiving process is unsuccessful. In a 5-GHz-band wireless LAN, for example, Viterbi decoding is used in the error correcting process at the error correcting sections 25A, 25B. Error detection is performed using CRC codes in the error detecting process at the error detecting sections 26A, 26B.

The select section 27 makes a final decision whether the receiving process is successful or unsuccessful, on the basis of the result of the decision at the error processing section 22A and 22B.

Specifically, if one of the two decisions has shown that the receiving process is successful, the select section 27 regards the final decision as successful, selects the received data determined to be successful, and outputs the selected data. If both of the two decisions have shown that the receiving process is successful, the select section 27 regards the final decision as successful, selects one of the two reception data items, and outputs the selected data.

If both of the two decisions have shown that the receiving process is unsuccessful, the select section 27 regards the final decision as unsuccessful and does not output the received data.

Figure 8:
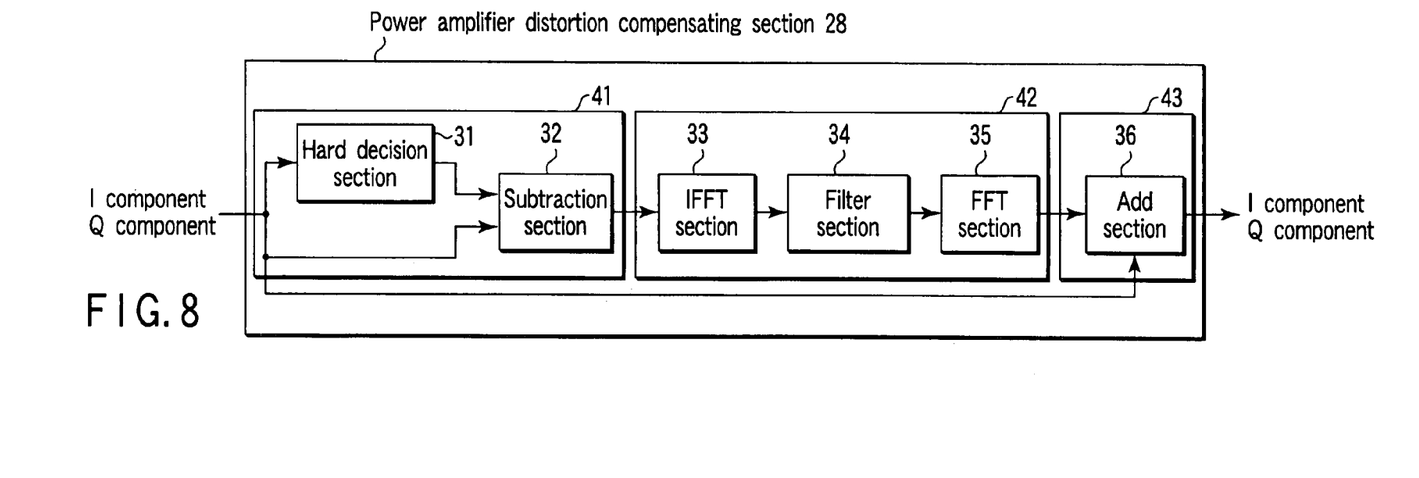
FIG. 8 shows an example of the power amplifier distortion correcting section in FIG. 6.

FIG. 8 shows a concrete example of the power amplifier distortion compensating section.

Power amplifier distortion is compensated by extracting the power amplifier distortion from the received data and adding the power amplifier distortion to the received data.

A difference detecting section 41 is composed of a hard decision section 31 and a subtraction section 32. A distortion extracting section 42 is composed of an IFFT (Inverse Fast Fourier Transform) section 33, a filter section 34, and an FFT (Fast Fourier Transform) section 35. The distortion extracting section 42 is a part which subjects the data to filtering in time domain and determines the power amplifier distortion practically. A correcting section 43 is composed of an add section 36.

The hard decision section 31 makes a hard decision on the received data (I component and Q component) and outputs the hard decision data. The subtraction section 32 calculates the difference between the hard decision and the received data. The IFFT section 3e transforms the frequency domain output data (or the result of the difference) from the subtraction section 32 into time domain data.

The filter section 34 filters the output data from the IFFT section 33, thereby extracting the power amplifier distortion. The filter section 34 is composed of, for example, a threshold circuit which rounds off a value smaller than a specific value to zero.

The power amplifier distortion extracted at the filter section 34 is put back from the time domain to the frequency domain at the FFT section 35. Then, the add section 36 adds compensation data for removing the power amplifier distortion to the original received data (I component and Q component).

As a result, the power amplifier distortion compensation section 28 outputs the received data from which the power amplifier distortion has been removed.

Figure 9:
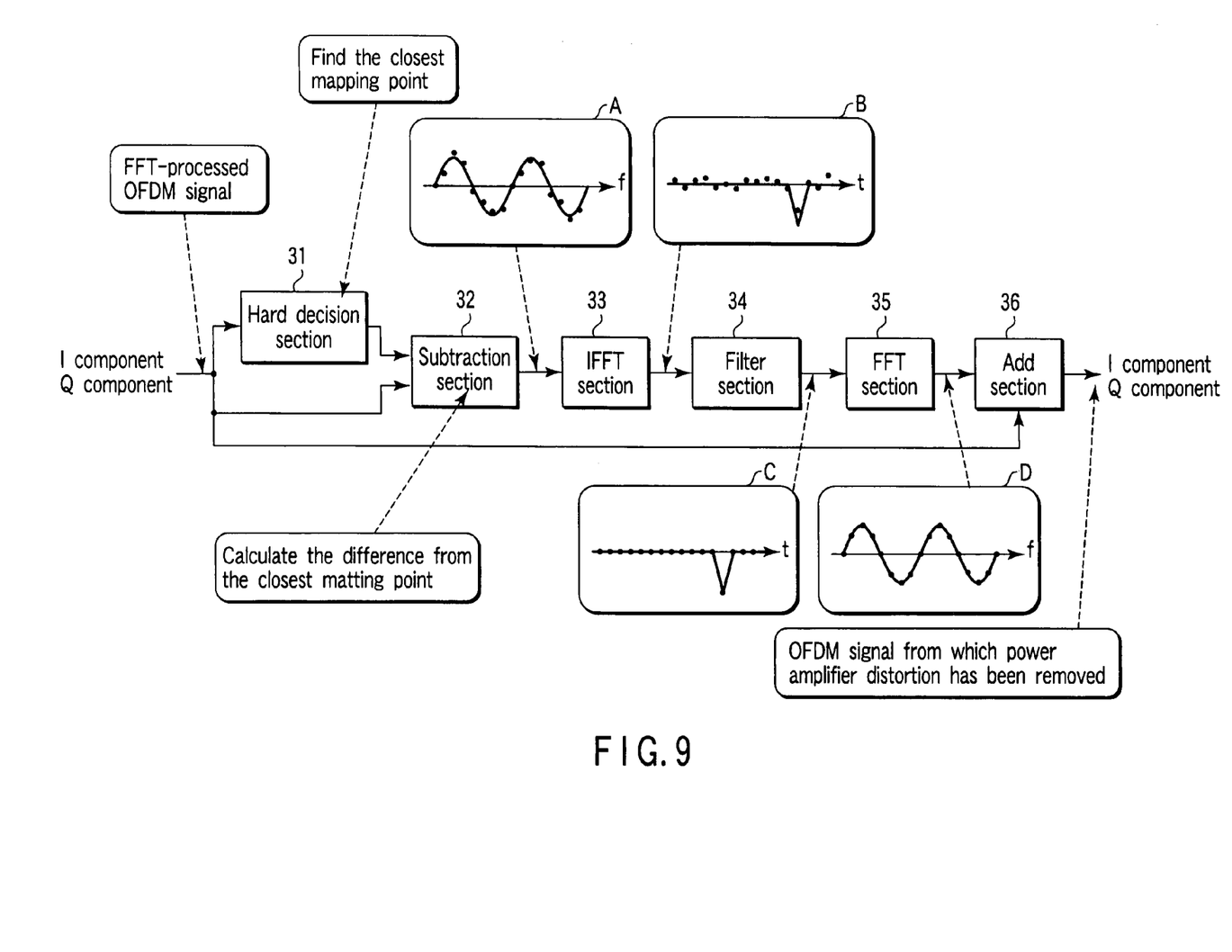
FIG. 9 is a diagram to help explain the data processing at the power amplifier distortion correcting section of FIG. 8.

FIG. 9 concretely shows the data processing at the power amplifier distortion correcting section.

Figure 10:
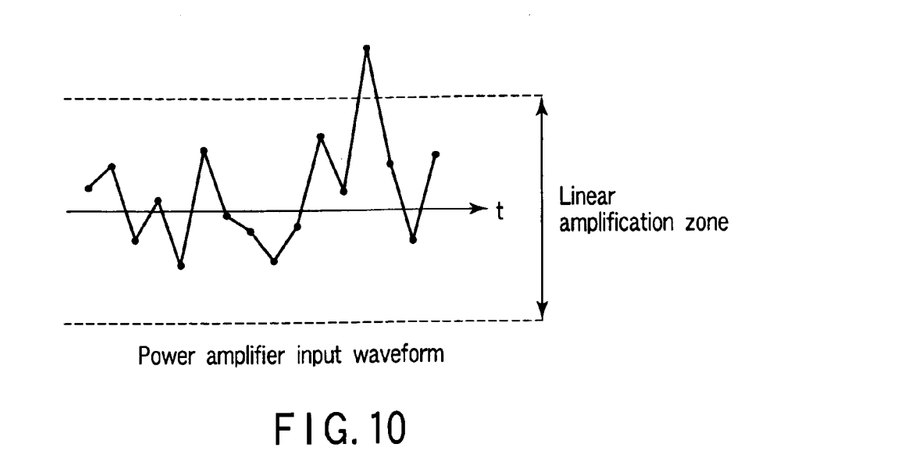
FIG. 10 shows an example of an input waveform to the transmission-side power amplifier.
Figure 11:
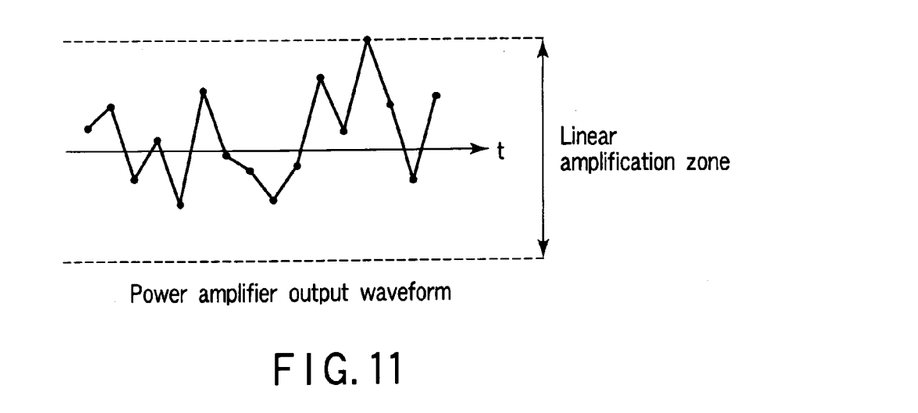
FIG. 11 shows an example of an output waveform from the transmission-side amplifier.
Figure 12:
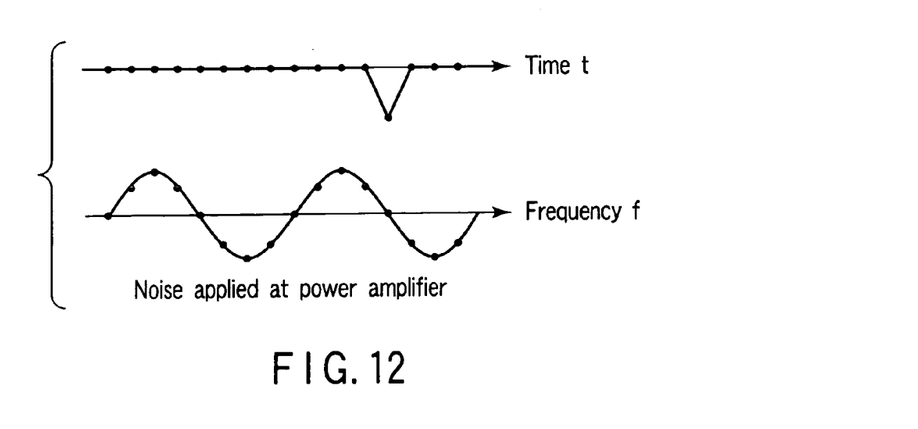
FIG. 12 shows an example of power amplifier distortion.

It is assumed that the input waveform of the transmission-side power amplifier is as shown in FIG. 10 and the output waveform of the transmission-side power amplifier is as shown in FIG. 11. Power amplifier distortion occurs when the input data for the transmission-side power amplifier has exceeded a linear amplification zone. The distortion (or noise) is represented in the time domain as shown in FIG. 12.

In this invention, the reception-side power amplifier distortion compensating section detects and compensates the power amplifier distortion.

The hard decision section 31 finds out a mapping point on the frequency axis which is closest to each received point of the FFT-processed OFDM signal (I component and Q component). Then, the subtraction section 32 calculates the difference between the received point and the closest mapping point.

The difference is as shown by "A" on the frequency axis (or in the output data from the subtraction section 32) and is as shown by "B" on the time axis (or in the output data from the IFFT section 33). The filter section 34 performs a filtering process by which, for example, the data with a value smaller that a specific value is rounded off to zero.

As a result, the output data from the filter section 34 is as shown by "C" on the time axis. When the FFT section 35 transforms the data on the time axis to those on the frequency axis, the data shown by "D" is obtained.

Then, the add section 36 adds compensation data for removing the power amplifier distortion shown by "D" to the original OFDM signal (I component and Q component) subjected to the FFT process. As a result, the add section 36 outputs the received data from which the power amplifier distortion has been removed.

As described above, the multicarrier modulation signal receiving apparatus of the present invention determines whether the receiving process is successful or unsuccessful on the basis of not only the determination of error when power amplifier distortion is not compensated, or when only channel compensation and phase rotation compensation are performed, but also the determination of error when power amplifier distortion is corrected in addition to those two compensations.

That is, when one of the two decisions has shown that the receiving process is successful, the receiving apparatus regards the receiving process as successful. Only when both of the two decisions have shown that the receiving process is unsuccessful, the receiving apparatus regards the receiving process as unsuccessful. Therefore, the receiving apparatus can salvage the received data which would have failed to be received because of conventional power amplifier distortions. As a result, the receiving apparatus can increase the probability of successful receiving process and improve the quality of communication.

In addition to such an effect, the multicarrier modulation signal receiving apparatus of the present invention also produces the effect of decreasing the power consumption of the transmitting apparatus.

That is, since the receiving apparatus compensates for power amplifier distortions, this makes it possible to decrease the amount of back-off in the transmitting apparatus without increasing the probability of unsuccessful receiving process. As a result, the power consumption of the transmission-side power amplifier can be reduced, which contributes to the reduction of the power consumed in the transmitting apparatus.

In the case of a transmitting and receiving system composed of a combination of a transmitting apparatus and a receiving apparatus, the amount of electric power saved as a result of a decrease in the amount of back-off in the transmission-side power amplifier is sufficiently greater than the amount of electric power increased by the component parts added in the present invention, that is, the power amplifier distortion compensating section 28, error processing section 22B, and select section 27 in the receiving apparatus.

Therefore, the transmitting and receiving system can also realize less power consumption.

In the embodiment, the two received signals obtained from the two different compensating processes have been subjected to separate error processes and, on the basis of the results of the processes, whether the receiving process is successful or unsuccessful has been determined. However, the number of compensating processes or the number of error processing sections for determining whether the receiving process is successful or unsuccessful is not limited to two. For instance, the number may be three or more.

It is clear that the power amplifier distortion compensating process can be applied similarly to impulse noise in the channel. When the multicarrier modulation signal receiving apparatus of the present invention is used in a channel in which there is impulse noise, this produces the effect of improving the quality of communication and achieving less power consumption as described above.

As described above, the multicarrier modulation signal receiving apparatus of the invention determines whether the receiving process is successful or unsuccessful on the basis of not only the determination of error when power amplifier distortion is not compensated, or when only channel compensation and phase rotation compensation are performed, but also the determination of error when power amplifier distortion is compensated in addition to those two corrections. That is, when one of the two decisions has shown that the receiving process is successful, the receiving apparatus regards the receiving process as successful. Only when both of the two decisions have shown that the receiving process is unsuccessful, the receiving apparatus regards the receiving process as unsuccessful. Therefore, the receiving apparatus can increase the probability of successful data receiving and improve the quality of communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A power amplifier distortion correcting circuit comprising:
    a hard decision section configured to make a hard decision on said reception data and outputs configured to output the hard decision data,
    a subtraction section configured to sense the difference between said reception data and said hard decision data,
    a distortion extracting section configured to extract said power amplifier distortion on the basis of said difference, and
    an add section configured to add correction data for removing said power amplifier distortion to said reception data.

2. The power amplifier distortion correcting circuit according to claim 1, wherein said distortion extracting section includes:
    an inverse Fourier transform section configured to transfer said difference from a frequency axis to a time axis,
    a filter section configured to extract said power amplifier distortion on the basis of said difference on said time axis, and a Fourier transform section configured to transfer said power amplifier distortion from said time axis to said frequency axis.

3. A method of correcting a power amplifier distortion comprising:

making a hard decision on said reception data and outputting the hard decision data, sensing the difference between said reception data and said hard decision data, extracting said power amplifier distortion on the basis of said difference, and adding correction data for removing said power amplifier distortion to said reception data.

4. The method according to claim 3, wherein the extracting said power amplifier distortion further includes:

transferring said difference from a frequency axis to a time axis, extracting said power amplifier distortion by filtering on the basis of said difference on said time axis, and transferring said power amplifier distortion from said time axis to said frequency axis.

* * * * *